United States Patent [19]

Thompson

[11] Patent Number: 4,488,386
[45] Date of Patent: Dec. 18, 1984

[54] FLOOD SHIELD ASSEMBLY

[76] Inventor: William W. Thompson, Box M, Mercer, Wis. 54547

[21] Appl. No.: 437,898

[22] Filed: Nov. 1, 1982

[51] Int. Cl.³ .............................................. E04G 21/24
[52] U.S. Cl. .................................... 52/169.1; 52/746; 160/23 R
[58] Field of Search .................... 160/23 R; 52/169.1, 52/169.14, 202, 746, 169.5, 169.5

[56] References Cited

U.S. PATENT DOCUMENTS

| 486,459 | 11/1892 | Gerhard | 160/23 R |
| 2,271,143 | 1/1952 | Martinus | 52/169.14 |
| 2,961,255 | 11/1960 | Trott | 52/169.12 |
| 4,019,304 | 4/1977 | Timm | 52/746 |
| 4,425,744 | 1/1984 | Villareal | 52/169.14 |

Primary Examiner—James L. Ridgill, Jr.
Attorney, Agent, or Firm—Andrus, Sceales, Starke & Sawall

[57] ABSTRACT

A flood shield assembly for providing an exterior waterproof barrier for a building includes a roll of flexible, waterproof material having its leading edge attached to the foundation of the building below ground level. The remainder of the roll is stored in a box having a cover at ground level. The waterproof material is formed in one-piece and has an overall length which substantially corresponds to the exterior dimensions of the building with which it is employed. In the event of a flood threat the roll of waterproof material is removed from the box, drawn upwardly along, and attached to the side of the building to provide a barrier between the house and the flood waters.

6 Claims, 6 Drawing Figures

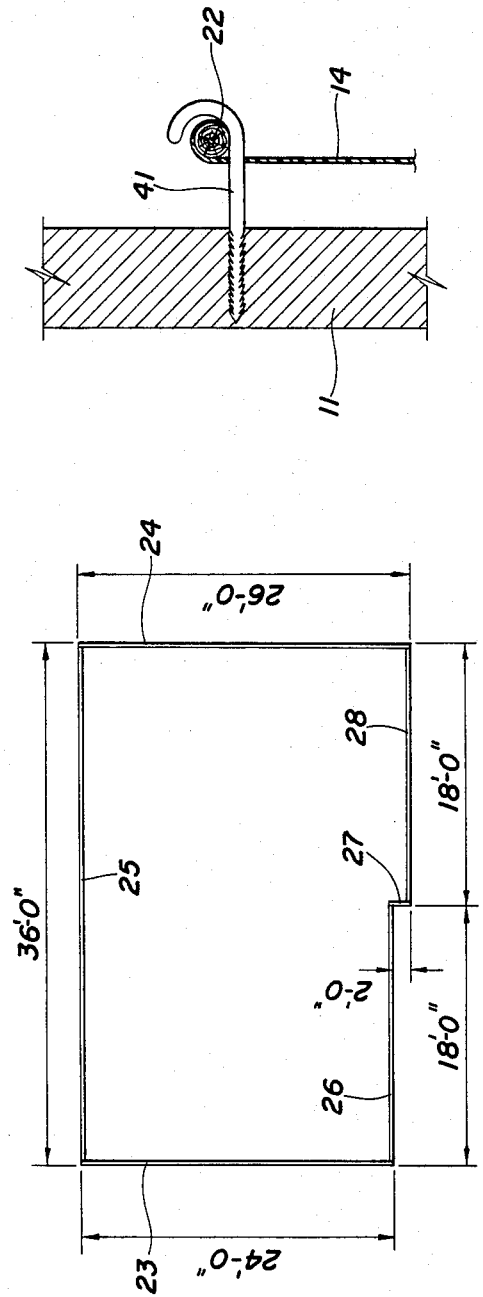
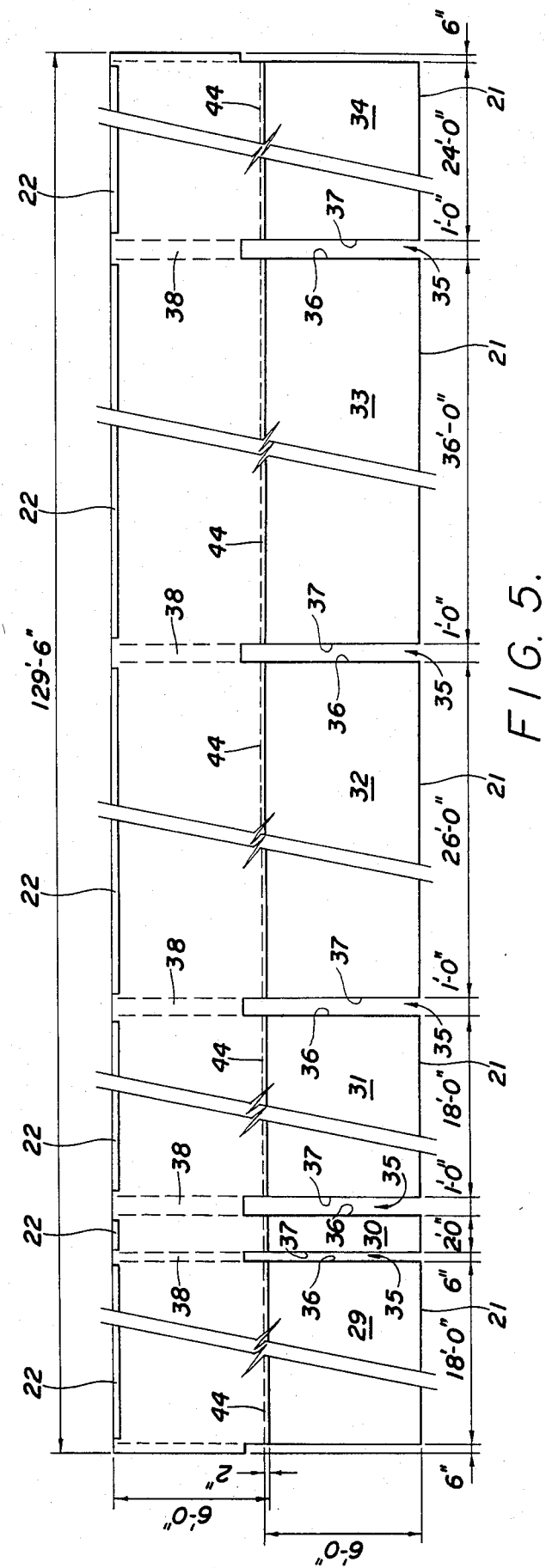

FLOOD SHIELD ASSEMBLY

BACKGROUND OF THE INVENTION

The present invention relates to static structures such as buildings, and more particularly to a flood shield assembly which provides an exterior waterproof barrier for the building.

Various flood control techniques have been developed over the years in an attempt to protect land and buildings from floods. Some of these techniques include the construction of river embankments, soil conservation and reforestation. In spite of these techniques, flood waters may still at times reach and damage the structure as well as the interior contents of commercial and residential buildings. It is thus desirable to provide a means for protecting such buildings and their contents from the devastating effects of flood waters.

U.S. Pat. No. 2,961,255 shows a trailer skirt designed to close off the open space between a house trailer and the ground. The skirt is utilized to give the trailer a more attractive appearance, to provide a storage area underneath the trailer, and to prevent wind from passing beneath the trailer floor. Such a skirt, however, would not protect the trailer against flood waters since it does not provide a fluid tight arrangement and does not extend upwardly along the walls of the trailer to protect the windows and doors.

SUMMARY OF THE INVENTION

A flood shield assembly for providing an exterior waterproof barrier for a building. The assembly is utilized to protect the building and its contents from the damaging effects of flood water.

The flood shield assembly includes a storage box located exteriorly of the building at substantially ground surface level which extends lengthwise along a foundation wall, and a shield of flexible, waterproof material contained within the box. The box includes a hinged cover which is located at ground level for ease of access to the shield. The box is constructed of a material such as fiberglass to prevent rotting, and includes a plurality of sections placed end to end in combinations that best suit the exterior dimensions of the building with which it is employed.

The waterproof shield is constructed of neoprene having one end fixedly attached to the foundation of the building beneath ground level and its other end removable from the box. In the event of a flood threat the other end of the shield may be drawn upwardly along the exterior of the wall of the building and attached thereto to provide a barrier between the building and the flood waters. In one form the other end of the shield is fixed to a dowel or roller and is stored in the box in a form of a roll with its one end extending downwardly to cover the foundation of the building and its leading edge affixed to the footing of the foundation.

The flood shield assembly also includes means located substantially above ground surface level for removably attaching the other end of the shield to the wall of the building. In one form this attaching means comprises a plurality of hook members projecting from the wall for receiving the ends of the dowels of the roll of waterproof material.

The shield is integrally formed in one-piece having an overall length substantially equal to the lengthwise exterior dimensions of the building with which it is employed. In order to accomplish this the shield includes a corner construction which enables it to pass around the corners of the building. The corner construction is formed by a cutout portion in the shield which extends upwardly from its lower end to have a length substantially equal to the height of the foundation of the building. When assembled on the building the longitudinal edges of the cutout portion abut one another and form a corner bag extending upwardly along a corner of the wall above ground level. The corner bag is glued along its bottom to provide a fluid tight seal. A corner member is positionable over the corner of the foundation to complete the assembly. The corner member has a length substantially equal to the height of the foundation and a width sufficient to overlap the abutting edges of the shield. The one-piece shield thus completely envelops the building and provides a waterproof barrier between the building and flood waters.

The present invention thus provides a simple yet effective waterproof barrier which protects commercial and residential buildings from the devastating effects of flood waters.

BRIEF DESCRIPTION OF THE DRAWINGS

The drawings illustrate the best mode presently contemplated of carrying out the invention.

In the drawings:

FIG. 4 is a top plan view illustrating the typical exterior dimensions of a residential house;

FIG. 5 is a plan view of the integral one-piece shield for use with the house shown in FIG. 4; and FIG. 6 is a detail view in cross section illustrating the manner of attaching the shield to the exterior of a house.

DESCRIPTION OF THE PREFERRED EMBODIMENT

Figure 1:
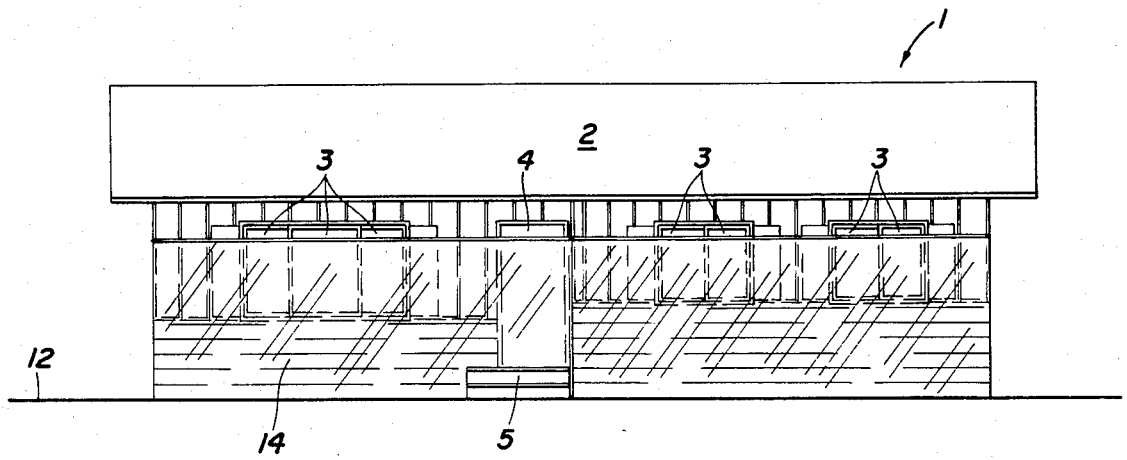
FIG. 1 is a front view in elevation of a typical residential house incorporating a flood shield assembly in accordance with the principles of the present invention illustrating the shield in its extended position.

Referring now to the drawings, FIG. 1 illustrates a typical residential house, designated by the numeral 1, which is equipped with a flood shield assembly in accordance with the present invention. As noted the house 1 is of a typical design and conforms to the plan shown in FIG. 4. The house 1 is shown for illustrative purposes only as the flood shield assembly of the present invention may be custom manufactured for use with various shapes and configurations of commercial and residential buildings. As is conventional, the house 1 includes a roof 2 supported by a plurality of outside walls, a plurality of windows 3, a front door 4, and a stoop 5 leading to the door 4.

Figure 2:
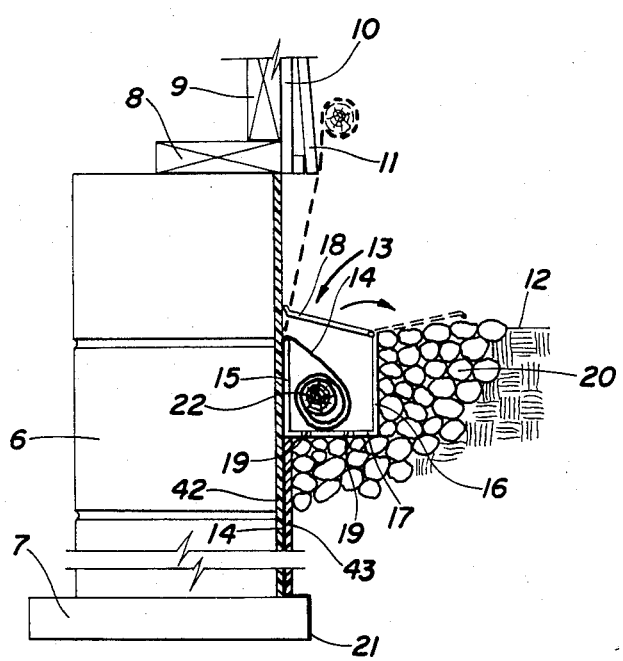
FIG. 2 is a fragmentary view in cross-section taken vertically through the storage box and illustrating the shield in its stored position.

As a unique feature a flood shield assembly provides an exterior waterproof barrier for the house shown in FIG. 1. As shown in FIG. 2, the house 1 includes a foundation having a wall 6 of conventional block and mortar construction and a footing 7 for supporting the wall 6. The wall 6 in turn supports a plurality of parallel, horizontally extending joists 8 that hold up the planks of a floor, and a plurality of parallel, vertically extending studs 9 which support sheathing 10 and siding 11 which form the outside walls of house 1. Thus, in a typical house construction the outside walls are supported at or slightly above ground surface level which is designated by the numeral 12.

The flood shield assembly includes a storage box 13 and a one-piece shield 14 of flexible, waterproof material. The storage box 13 is located exteriorly of the foundation wall 6 at substantially ground surface level 12 and extends longitudinally along wall 6. The box 13 is rectangular in shape and includes a rear wall 15 facing the outer surface of wall 6, a front wall 16, a bottom wall 17 and a hinged cover 18. As shown in FIG. 2 the cover 18 is substantially at ground level 12 with the walls 15–17 below ground level 12. The box 13 is constructed of a material which will not rot or decay, such as fiberglass. The bottom wall 17 of box 13 includes a plurality of drain holes 19 which allow any accumulated moisture to escape from box 13. In adddition, box 13 is surrounded by gravel 20 to improve drainage. Box 13 may comprise an integral unit extending from one corner of house 1 to another corner of house 1, or may comprise a plurality of shorter sections which are placed end to end. It is contemplated that such units or sections will be made in various standardized lengths and applied end to end in combinations that best suit the dimensions of the house to which they are applied.

Referring again to FIG. 2, shield 14 comprises a roll of heavy gauge neoprene having its leading edge 21 attached to the foundation of the house below ground level. As shown, the leading edge 21 extends downwardly to the footing 7 and is affixedly attached thereto by a non-hardening tar. The remainder of the roll is stored within box 13 with the other end of shield 14 fixed to a dowel or roller 22. The dowel 22 is constructed of pressure treated wood to prevent rotting. As shown in FIG. 2, the shield 14 is assembled in position by first covering the outside surface of the foundation wall 6 with a non-hardening tar layer 42, then positioning the leading edge 21 of shield 14 against the outside of footing 7, and finally covering shield 14 with another tar layer 43 to affix the neoprene material to the foundation of the house.

The waterproof shield 14 is constructed as an integral one-piece unit having an overall length which substantially corresponds to the external dimensions of the house with which it is to be used. FIG. 5 shows a typical layout for shield 14 for use with the plan of the house shown in FIG. 4. The house of FIG. 4 includes six planar outside walls, namely, side walls 23 and 24, rear wall 25, and a front wall which consists of three sections 26–28. FIG. 5 shows the layout for shield 14 which would be utilized with the dimensions shown in FIG. 4. Thus, section 29 of shield 14 corresponds to and would be employed to cover section 26 of the front wall while sections 30 and 31 of shield 14 would be employed with sections 27 and 28 of the front wall, respectively. Further, section 32 of shield 14 would be employed with side wall 24, section 33 with rear wall 25, and section 34 with side wall 23. As shown, each section 29–34 of shield 14 includes a dowel or roller 22 which substantially corresponds to the length of that section, and a two inch glue lap 44 located about equal distances from the leading edge 21 and the rollers 22.

Figure 3:
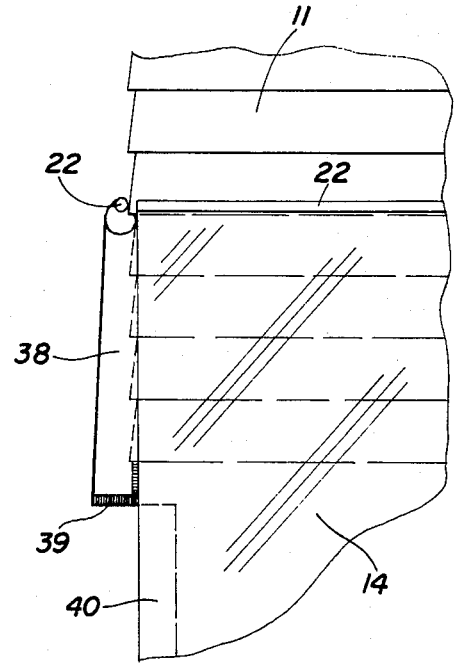
FIG. 3 is a fragmentary view in elevation illustrating a corner construction for the flood shield assembly.

As shown in FIG. 5, each section 29–34 of shield 14 is separated by a cutout portion 35 extending upwardly from the leading edge 21. Each portion 35 has a length substantially equal to the height of the foundation wall 6, and includes a pair of opposing longitudinal edges 36 and 37. The function of the cutout portions 35 is to form a corner construction for passing around the corners of the foundation and outside walls of the house. As shown in FIG. 3, each corner construction is formed by positioning the longitudinal edges 36 and 37 of a cutout portion 35 in an abutting relationship with one another at a corner of the foundation prior to tarring. When this is accomplished the material of shield 14 which is above the cutout portions 35 forms a corner bag 38. The corner bag 38 extends upwardly along the corner of the outside wall from the cutout portion 35 to the dowels or rollers 22. To complete the construction, each bag 38 is glued along its bottom edge to provide a fluid-tight seal 39. The material which was cutout from the shield 14 to form the portions 35 may then be utilized as corner members 40 which are positionable over the corners of the foundation to provide a fluid-tight arrangement for the foundation corners. Each corner member 40 has a length substantially equal to the height of the foundation and a width sufficient to overlap the abutting edges 36 and 37. The corner members 40 may be covered with tar in a manner similar to the tarring of leading edges 21.

In order to removably attach shield 14 to house 1, the flood shield assembly includes means located substantially above ground surface level 12 for removably attaching the rollers 22 to the walls 23–28. This attaching means may include a plurality of anchors or hook members 41 projecting from the walls 23–28 for receiving the ends of the rollers 22. Thus, there would be at least two hook members 41 for each roller 22 shown in FIG. 5.

In operation, the flood shield assembly will be installed in the manner described and stored until needed. In the event of a flood threat, the roll of neoprene is removed from the box 13 and pulled or drawn upwardly along the side of the house until the rollers 22 are received within the hooks 41. This process is performed for each outside wall 23–28 of house 1 until the shield 14 provides a waterproof barrier between the house 1 and the flood waters. After the flood waters have subsided, the rollers 22 may be removed from hook members 41 and each section 29–34 of shield 14 may once again be rolled up and stored in its corresponding box 13.

A flood shield assembly has been shown and described which provides a waterproof barrier between a building and flood waters. Various modifications and/or substitutions of the specific components described herein may be made without departing from the scope of the invention. For example, the shield need not necessarily be stored as a roll within box 13, but instead could be stored in a folded arrangement. In addition, dowels or rollers 22 need not necessarily be used but instead the upper end of shield 14 could have metal eyelets formed therein which could be utilized with the hook members 41 to hang the shield from the outside walls 23–28 of house 1.

Various modes of carrying out the invention are contemplated as being within the scope of the following claims particularly pointing out and distinctly claiming the subject matter which is regarded as the invention.

I claim:

1. A flood shield assembly for providing an exterior waterproof barrier for a building having a foundation and an outside wall supported above ground surface level, comprising:

a storage box located exteriorly of the building at substantially ground surface level and extending lengthwise along the wall;

a shield of flexible, waterproof material contained within said box having one end fixedly attached to and covering the foundation of the building and extending substantially below ground surface level and its other end removable from said box so that in the event of a flood threat said other end of the shield may be drawn upwardly along the exterior of the wall to provide a barrier between the building and the flood waters; and means located substantially above ground surface level for removably attaching said other end of the shield to the wall of the building.

2. The flood shield assembly of claim 1, wherein the building includes a plurality of interconnected outside walls forming a plurality of vertical corners and said shield includes a cutout portion extending upwardly from said one end to have a length substantially equal to the height of the foundation so that the longitudinal edges of said cutout portion abut one another at said vertical corners of said foundation and form a corner bag extending upwardly above said foundation along a corner of said outside wall from said cutout portion to said other end.

3. The flood shield assembly of claim 2, wherein said bag includes a fluid-tight seal along its bottom.

4. The flood shield assembly of claim 2, further including a corner member of flexible, waterproof material positionable over the corner of said foundation, said corner member having a length substantially equal to the height of said foundation and a width sufficient to overlap the abutting edges of the cutout portion of said shield.

5. A flood shield assembly for providing an exterior waterproof barrier for a building having a foundation and an outside wall supported above ground surface level comprising:

a storage box located exteriorly of the building at substantially ground surface level and extending lengthwise along the wall;

a shield of flexible, waterproof material contained within said box and having first and second end portions;

a first adhesive material applied to the foundation of the building;

a portion of said first end portion attached to and covering the foundation by means of said first adhesive with said first end portion extending substantially below ground surface level;

said second end portion removable from said box so that in the event of a flood threat said second end portion may be drawn upwardly along the exterior of the wall to provide a barrier between the building and the flood waters; and means located substantially above ground surface level for removably attaching said second end portion to the wall of the building.

6. The flood shield assembly of claim 5 further comprising a second adhesive material applied to the outer surface of said first end portion.

* * * * *